(12) United States Patent
Kumar et al.

(10) Patent No.: US 7,728,535 B2
(45) Date of Patent: Jun. 1, 2010

(54) CHOPPER CIRCUIT TOPOLOGIES FOR ADAPTING AN ELECTRICAL BRAKING SYSTEM IN A TRACTION VEHICLE

(75) Inventors: Ajith Kuttannair Kumar, Erie, PA (US); Henry Todd Young, North East, PA (US); Alvaro Jorge Mari Curbelo, Unterschleissheim (DE)

(73) Assignee: General Electric Company, Schenectady, NY (US)

( * ) Notice: Subject to any disclaimer, the term of this patent is extended or adjusted under 35 U.S.C. 154(b) by 321 days.

(21) Appl. No.: 11/766,259

(22) Filed: Jun. 21, 2007

(65) Prior Publication Data

US 2008/0315805 A1    Dec. 25, 2008

(51) Int. Cl.
    *H02P 3/00*    (2006.01)
(52) U.S. Cl. .............. 318/362; 318/139; 318/375; 180/65.3; 180/65.8
(58) Field of Classification Search .......... 318/139, 318/375, 362, 376; 180/65.3, 65.8
See application file for complete search history.

(56) References Cited

U.S. PATENT DOCUMENTS

| | | | |
|---|---|---|---|
| 4,354,223 A | 10/1982 | Turnbull | |
| 4,450,388 A * | 5/1984 | Markham | ............ 318/87 |
| 5,117,166 A | 5/1992 | Kumar | |
| 5,208,741 A | 5/1993 | Kumar | |
| 5,323,095 A | 6/1994 | Kumar | |
| 5,436,540 A * | 7/1995 | Kumar | ............ 318/375 |
| 6,043,996 A * | 3/2000 | Kumar | ............ 363/41 |
| 7,176,653 B2 * | 2/2007 | Jahkonen | ............ 318/807 |
| 7,185,591 B2 | 3/2007 | Kumar et al. | |
| 2004/0238243 A1 * | 12/2004 | King et al. | ............ 180/65.2 |
| 2005/0005814 A1 | 1/2005 | Kumar et al. | |
| 2006/0132073 A1 | 6/2006 | Pispa | |

FOREIGN PATENT DOCUMENTS

WO     WO 2005/118329 A    12/2005

* cited by examiner

*Primary Examiner*—Walter Benson
*Assistant Examiner*—Thai Dinh
(74) *Attorney, Agent, or Firm*—Robert Wawrzyn, Esq.; Enrique Mora, Esq.; Beusse, Wolter, Sanks, Mora & Maire, P.A.

(57) ABSTRACT

An adaptable electrical braking system for an electrical propulsion system of a traction vehicle is provided. The electrical braking system is configured to dissipate electrical energy in a plurality of resistor grids. The braking system includes a braking system assembly including a baseline chopper circuit topology. The baseline chopper circuit topology includes a first semiconductor-based circuitry in an enclosure for accommodating the first semiconductor-based circuitry. The braking system further includes a second semiconductor-based circuitry electrically coupled to the first semiconductor-based circuitry to produce a chopper including a chopper circuit topology fully contained in the enclosure. The second semiconductor-based circuitry includes a circuit topology selectable to adapt the baseline chopper circuit topology to meet distinct operational requirements to be fulfilled by the braking system.

3 Claims, 6 Drawing Sheets

CHOPPER CIRCUIT TOPOLOGIES FOR ADAPTING AN ELECTRICAL BRAKING SYSTEM IN A TRACTION VEHICLE

This application is related to U.S. patent application Ser. No. 11/766,205, titled "Kit And Method For Reconfiguring An Electrical Braking System For A Traction Vehicle" filed concurrently herewith and incorporated by reference herein in its entirety.

FIELD OF THE INVENTION

The present invention is generally related to electromotive traction systems for traction vehicles, and, more particularly, to a kit and method for reconfiguring an electrical braking system, as may be part of a traction system in a land-based traction vehicle, such as an off-highway vehicle, railroad locomotive, transit vehicle.

BACKGROUND OF THE INVENTION

FIG. 1 is an electrical schematic of a prior art electromotive traction system, as typically used in an off-highway vehicle. A DC output of an electrical power source 104 is connected to a DC bus 122 that supplies DC power to one or more traction motors 108. The DC bus 122 may also be referred to as a traction bus 122 because it carries the power used by the traction motor subsystems. A typical diesel-electric off-highway vehicle may include two traction motors 108 in a single axle implementation, one traction motor per each wheel, which in combination operate as an axle assembly, or axle-equivalent. It is noted that the vehicle may be also be configured to include a single traction motor per axle or may be configured to include four traction motors, one per each wheel of a two axle-equivalent four-wheel vehicle. In FIG. 1, each traction motor subsystem 124A and 124B comprises an inverter (e.g., inverter 106A and 106B) and a corresponding traction motor (e.g., traction motor 108A and 108B, respectively).

During braking, the power generated by the traction motors 108 is dissipated through a typical prior art electrical braking system 110. As illustrated in FIG. 1, electrical braking system 110 includes a plurality of contactors (e.g., contactors DB1 through DB5) for switching a plurality of power resistive elements electrically coupled between the positive and negative rails of the DC bus 122. Each vertical grouping of resistors may be referred to as a string. One or more power grid cooling blowers (e.g., blowers BL1, BL2) are normally used to remove heat generated in a string due to electrical braking.

FIG. 2 is a block diagram representative of one known physical layout of basic building blocks as implemented in a known traction system, and, more particularly, in a traction system that uses an electrical braking system that utilizes a combination of mechanical contactors and solid state power switches (e.g., semiconductor-based circuitry). As shown in FIG. 2, a cabinet 130 in the off-highway vehicle is configured to accommodate a group of four traction inverters with semiconductor-based circuitry (not shown) fully occupying four respective enclosures $132_1$, $132_2$, $132_3$ and $132_4$. Cabinet 130 in part accommodates a chopper circuit that uses semiconductor-based circuitry (not shown) arranged in a respective enclosure $132_5$ having the same form and fit as the inverter enclosures $132_1$, $132_2$, $132_3$ and $132_4$. It is noted that the semiconductor-based circuitry for the chopper circuit has a footprint that defines at least one cavity (e.g., cavity 133) in enclosure $132_5$. FIG. 2 further illustrates a contactor box 134 externally disposed with respect to cabinet 130 for accommodating one or more contactors (e.g., contactors DB1-DB5) that in combination with the semiconductor-based circuitry arranged in enclosure $132_5$ make up the chopper circuit for driving the electrical power-dissipating elements, such as resistive elements.

Electrical braking systems that use mechanical contactors tend to have a relatively high life cycle cost driven by maintenance of the contactors. Moreover, electrical braking systems that use mechanical contactors may not provide optimal performance as the drive system must wait for the contactors to close before retard power can be produced. This wait may be relatively long as it is subject to the constraints of a mechanical component. Space and weight also need to be efficiently allocated in connection with any retrofit installation that may be performed to the electrical braking subsystem of an off-highway vehicle.

Therefore, there is a need for providing a lower cost, lower maintenance and higher performance solution for controlling the flow of retarding (e.g., dynamic braking) power supplied into a resistor grid bank in an off-highway vehicle. It would be further desirable to provide a retrofit installation that improves the electrical braking system of an off-highway vehicle, without requiring extensive modifications.

BRIEF DESCRIPTION OF THE INVENTION

The present invention in one aspect thereof provides an adaptable electrical braking system for an electrical propulsion system of a traction vehicle. The electrical braking system is configured to dissipate electrical energy in a plurality of resistor grids. The braking system includes a braking system assembly including a baseline chopper circuit topology. The baseline chopper circuit topology includes a first semiconductor-based circuitry in an enclosure for accommodating the first semiconductor-based circuitry. The braking system further includes a second semiconductor-based circuitry electrically coupled to the first semiconductor-based circuitry to produce a chopper including a chopper circuit topology fully contained in the enclosure. The second semiconductor-based circuitry includes a circuit topology selectable to adapt the baseline chopper circuit topology to meet distinct operational requirements to be fulfilled by the braking system.

The present invention in another aspect thereof provides an electrical propulsion system for a traction vehicle that includes an adaptable electrical braking system configured to dissipate electrical energy in a plurality of resistor grids. The braking system includes a braking system assembly including a baseline chopper circuit topology. The baseline chopper circuit topology includes a first semiconductor-based circuitry in an enclosure for accommodating the first semiconductor-based circuitry. The braking system further includes a second semiconductor-based circuitry electrically coupled to the first semiconductor-based circuitry to produce a chopper including a chopper circuit topology fully contained in the enclosure. The second semiconductor-based circuitry includes a circuit topology selectable to adapt the baseline chopper circuit topology to meet distinct operational requirements to be fulfilled by the braking system.

The present invention in yet another aspect thereof provides a method for adapting an electrical braking system to meet distinct operational requirements in an electrical propulsion system of a traction vehicle. The method includes providing a braking system assembly comprising a chopper comprising a baseline chopper circuit topology. The first chopper circuit topology includes a first semiconductor-based circuitry. The method further includes selecting a second semiconductor-based circuitry to adapt the baseline chopper circuit topology to meet distinct operational requirements to be fulfilled by the braking system. The second semiconductor-based circuitry is electrically coupled to the first semiconductor-based circuitry.

BRIEF DESCRIPTION OF THE DRAWINGS

The invention is explained in the following description in view of the drawings that show.

DETAILED DESCRIPTION OF THE INVENTION

Figure 1:
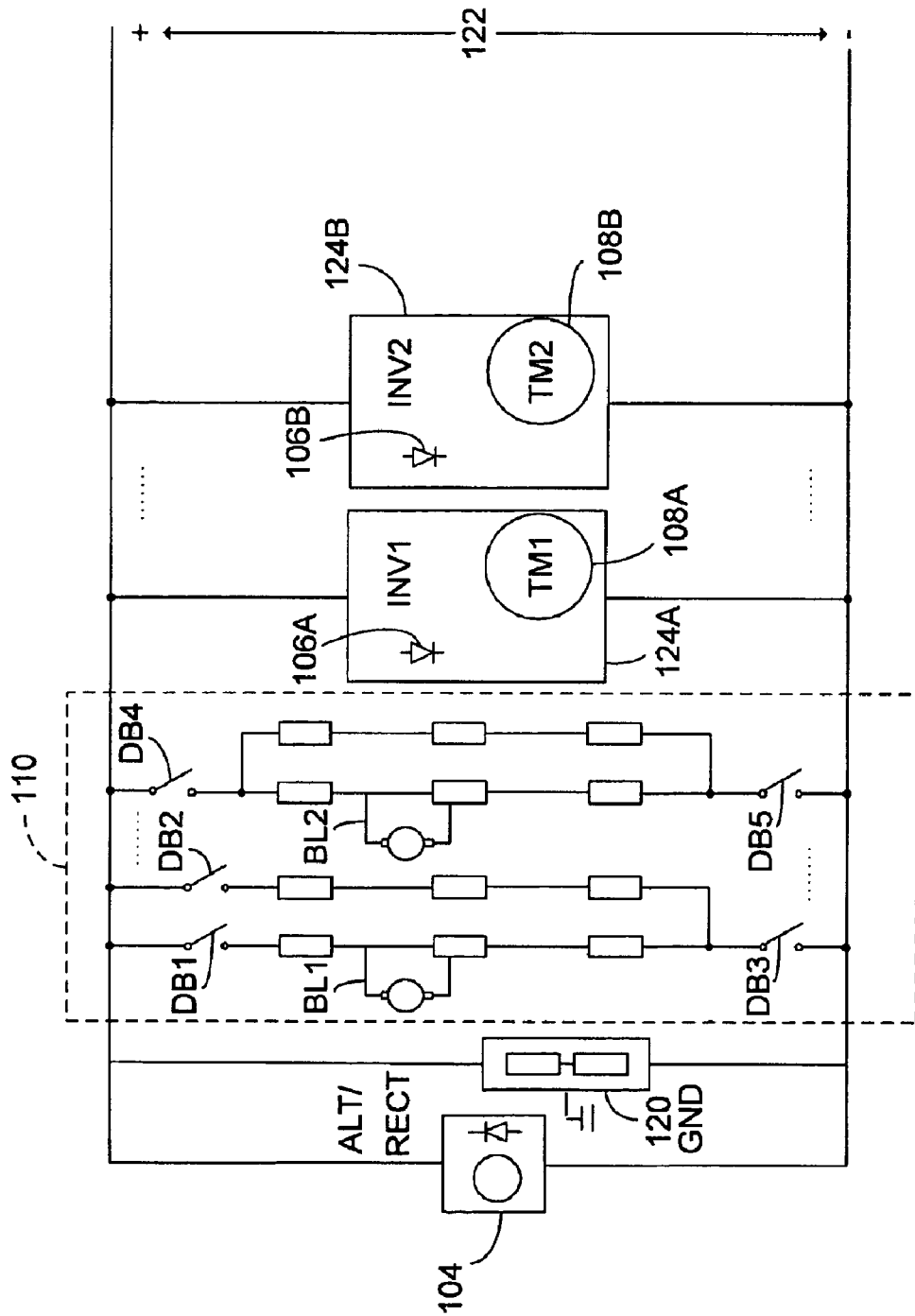
FIG. 1 is an electrical schematic of a prior art electromotive traction system, as may be used in an off-highway vehicle.
Figure 2:
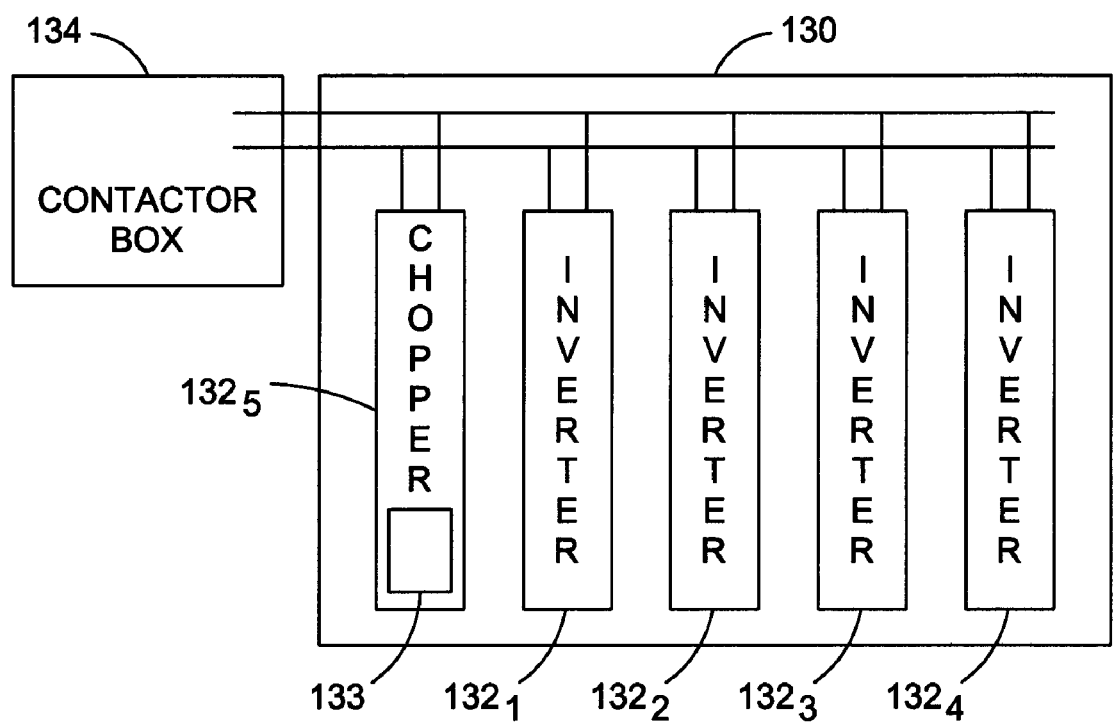
FIG. 2 is a block diagram representative of one known physical layout of basic building blocks as arranged in a traction system having an electrical braking system that utilizes a combination of mechanical contactors and solid state power switches.

Aspects of the present invention offer an improved electrical braking system as may be used in a relatively large land-based traction vehicle, such as an off-highway vehicle, transit vehicle, or a railroad locomotive. In one example embodiment, the electrical braking system (prior to being reconfigured with a kit embodying aspects of the present invention) may comprise a chopper circuit having electromechanical-based circuitry and semiconductor-based circuitry, such as discussed in the context of FIG. 2. This type of electrical braking system may be reconfigured to an improved electrical braking system comprising a chopper circuit exclusively having semiconductor-based circuitry.

Further aspects of the present invention offer an electrical braking system with a chopper circuit that may be cost-effectively created through innovative adaptations of a baseline chopper circuit topology with off-the-shelf power electronics (while maintaining a uniform physical form and fit) to meet distinct requirements to be fulfilled by the braking system while reducing life cycle costs by avoiding costly and burdensome maintenance commonly associated with contactors. In yet another aspect of the present invention, this improved electrical braking system may be used to implement a retrofit with minimal addition of off-the-shelf power electronics that may be arranged to provide incrementally higher power density over known chopper circuits. This may allow full solid-state control of the retarding grids without increasing footprint and volumetric requirements. The description below describes example embodiments of an improved electrical braking system in the context of a retrofit implementation. It will be appreciated, however, that aspects of the present invention are not limited to retrofit implementations since an improved electrical braking system embodying aspects of the present invention may be used equally effective in a newly manufactured off-highway vehicle.

Figure 3:
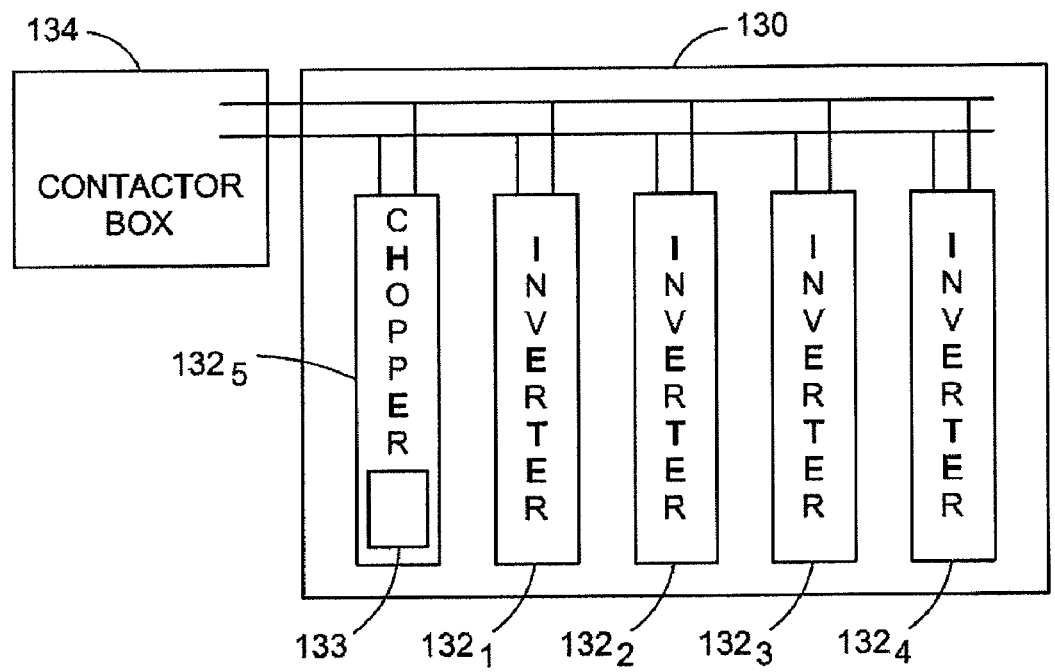
FIG. 3 is a block diagram of an exemplary off-highway vehicle that can benefit from an electrical braking system embodying aspects of the present invention.

FIG. 3 is a block diagram of an exemplary off-highway vehicle 200 that can benefit from an electrical braking system embodying aspects of the present invention. FIG. 3 generally reflects a typical diesel-electric off-highway vehicle. Example vehicles that can benefit from aspects of the present invention may include locomotives, mining trucks and excavators, where mining trucks and excavators range from 100-ton capacity to 400-ton capacity, but may be smaller or larger. Off highway vehicles typically have a power weight ratio of less than 10 horsepower (h.p.) per ton with a ratio of 5 h.p. per ton being common. Off-highway vehicles typically also utilize dynamic or electric braking. This is in contrast to a vehicle such as a passenger bus that has a ratio of 15 h.p. per ton or more and utilizes mechanically resistive braking.

As illustrated in FIG. 3, off-highway vehicle 200 includes a diesel engine 202 driving an alternator/rectifier 204. As is generally understood in the art, the alternator/rectifier 204 provides DC electric power to an inverter 206 that converts the AC electric power to a form suitable for use by a traction motor 208. One common off-highway vehicle configuration includes one inverter/traction motor per wheel 209, with two wheels 209 comprising the equivalent of an axle (not shown). Such a configuration results in one or two inverters per off-highway vehicle. FIG. 3 illustrates a single inverter 206 and a single traction motor 208 for convenience. By way of example, large excavation dump trucks may employ motorized wheels such as the GEB23™ AC motorized wheel employing the GE150AC™ drive system (both of which are available from the assignee of the present invention).

Strictly speaking, an inverter converts DC power to AC power. A rectifier converts AC power to DC power. The term "converter" is also sometimes used to refer to inverters and rectifiers. The electrical power supplied in this manner may be referred to as prime mover power (or primary electric power) and the alternator/rectifier 204 may be referred to as a source of prime mover power. In a typical AC diesel-electric off-highway vehicle application, the AC electric power from the alternator is first rectified (converted to DC). The rectified AC is thereafter inverted (e.g., using solid state power electronics such as Insulated Gate Bipolar Transistors (IGBTs) or thyristors operating as pulse-width modulators) to provide a suitable form of AC power for the respective traction motor 208. It will be appreciated that aspects of the present invention are not limited to the type of electromotive system utilized by the off-highway vehicle since the electromotive system may be one of various types of electromotive systems, such as an AC electromotive system, a DC electromotive system or a hybrid electromotive system.

As is understood in the art, traction motors 208 provide the tractive power to move off-highway vehicle 200 and any other vehicles, such as load vehicles, attached to off-highway vehicle 200. Such traction motors 208 may be an AC or DC electric motors. When using DC traction motors, the output of the alternator is typically rectified to provide appropriate DC power. When using AC traction motors, the alternator output is typically rectified to DC and thereafter inverted to three-phase AC before being supplied to traction motors 208.

The traction motors 208 also provide a braking force for controlling speed or for slowing and/or stopping the motion of off-highway vehicle 200. This is commonly referred to as dynamic braking, and is generally understood in the art. Simply stated, when a traction motor 208 is not needed to provide motive force, it can be reconfigured (via power switching devices) so that the motor operates as an electric power generator. So configured, the traction motor 208 generates electric energy which has the effect of slowing the off-highway vehicle. The electrical energy generated in the dynamic braking mode is typically transferred to resistance grids 210 mounted on the vehicle housing. Thus, the dynamic braking energy is converted to heat and dissipated from the system.

The off-highway vehicle may employ a single source of electrical energy source, however, two or more electrical energy sources may be employed. In the case of a single electrical energy source, diesel engine 202 coupled to alternator 204 constitutes a primary source of electrical energy. In the case where two or more electrical energy sources are provided, a first system comprises the prime mover power system that provides power to the traction motors 208. A second system (not shown) provides power for so-called auxiliary electrical systems (or simply auxiliaries). Such an auxiliary system may be derived as an output of the alternator, from the DC output, or from a separate alternator driven by the primary power source. For example, in FIG. 3, diesel engine 202 may drive the prime mover power source 204 (e.g., an alternator and rectifier), as well as any auxiliary alternators (not illustrated) used to power various auxiliary electrical subsystems such as, for example, lighting, air conditioning/heating, blower drives, radiator fan drives, control battery chargers, field exciters, power steering, pumps, and the like. The auxiliary power system may also receive power from a separate axle driven generator. Auxiliary power may also be derived from the traction alternator of prime mover power source 204.

Figure 4:
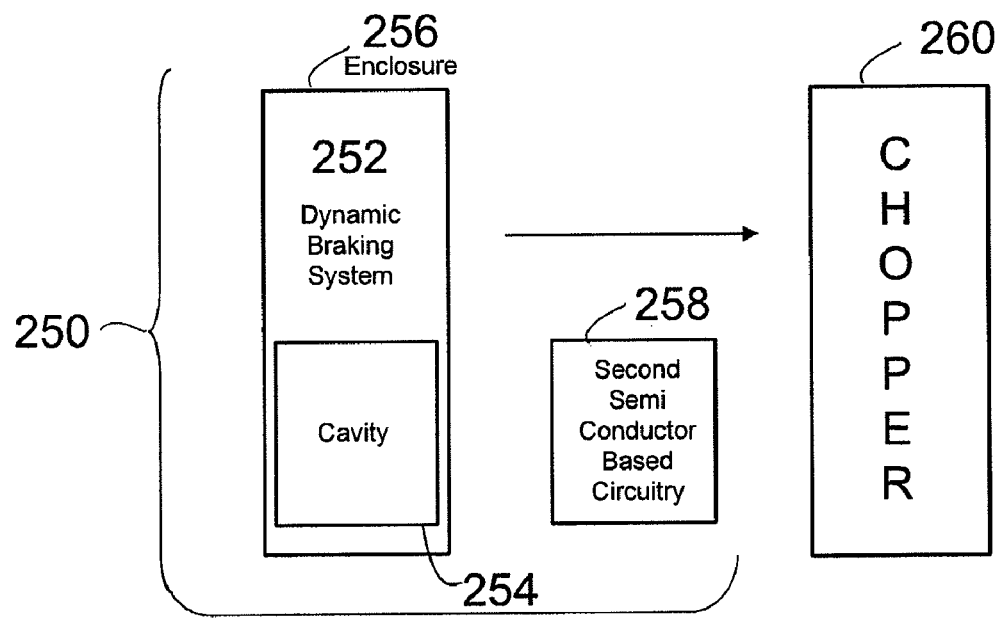
FIG. 4 is a block diagram representation of a kit embodying aspects of the present invention as may be used for reconfiguring an electrical braking system in a land-based vehicle, such as an off-highway vehicle.

FIG. 4 shows a block diagram representation of a kit 250 for reconfiguring an electrical (e.g., dynamic) braking system in a land-based vehicle, such as an off-highway vehicle. The electrical braking system (prior to being reconfigured with a kit embodying aspects of the present invention) may comprise a chopper circuit having electromechanical-based circuitry and semiconductor-based circuitry, such as discussed in the context of FIG. 2. This electrical braking system is to be reconfigured to an improved electrical braking system comprising a chopper circuit exclusively having semiconductor-based circuitry.

In one example embodiment, kit 250 comprises a dynamic braking system assembly 252 including a chopper circuit comprising a baseline chopper circuit topology. This baseline chopper circuit topology (e.g., first chopper circuit topology) may be made up of a first semiconductor-based circuitry having a footprint that defines at least one cavity 254 in an enclosure 256 for accommodating the first semiconductor-based circuitry. It is noted that enclosure 256 has the same form and fit as the respective enclosures accommodated by cabinet 130 (FIG. 2) in the off-highway vehicle. That is, the same form and fit as chopper circuit enclosure $132_5$ and inverter enclosures $132_1$, $132_2$, $132_3$ and $132_4$.

Kit 250 may further comprise a second semiconductor-based circuitry 258 to be arranged in the at least one cavity 254 in the enclosure 256. The second semiconductor-based circuitry 258 is electrically coupled to the first semiconductor-based circuitry to produce a chopper circuit 260 comprising a second chopper circuit topology fully contained in the enclosure 256. This chopper circuit topology functions without any electromechanical-based circuitry.

Figure 5:
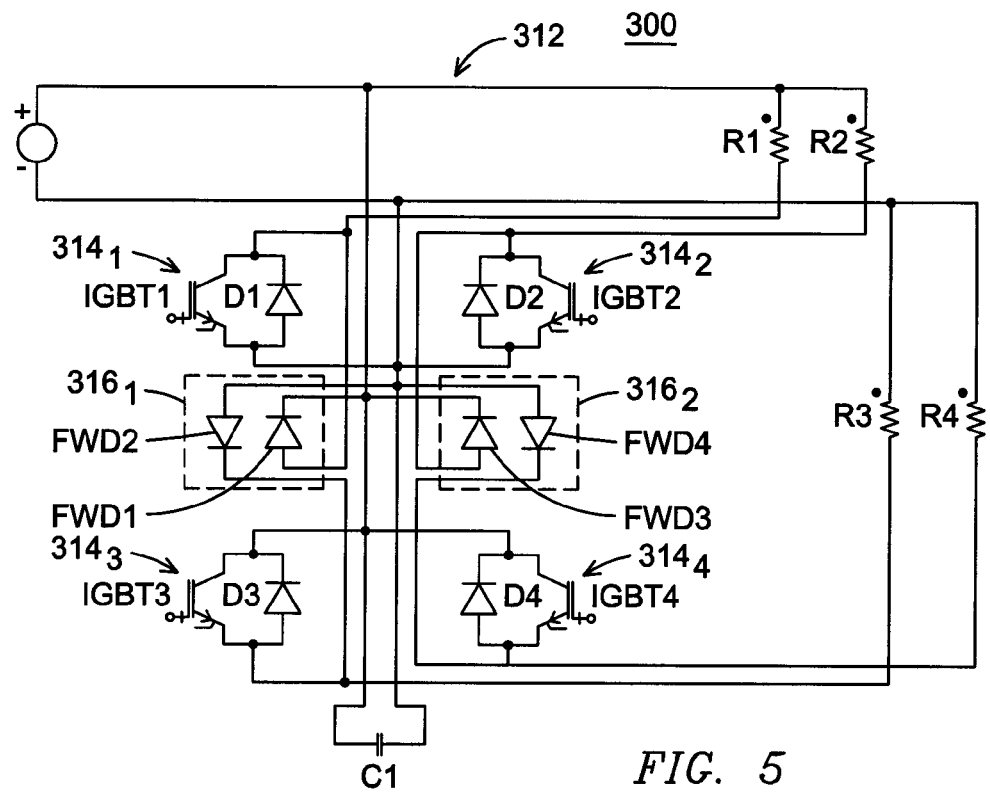
FIGS. 5-9 illustrate respective schematics indicative of electrical and physical layout arrangements of respective example embodiments of a chopper circuit embodying aspects of the present invention.

FIGS. 5-9 illustrate respective schematics indicative of electrical and physical layout arrangements of respective example embodiments of a chopper circuit embodying aspects of the present invention. FIG. 5 shows an example embodiment of a chopper circuit 300 configured in accordance with aspects of the present invention to drive a quadruple load of elements for dissipating electrical power, such as resistive elements R1 through R4 electrically coupled between the positive and negative rails of a DC bus 312. In this example embodiment, four semiconductor-based power switching modules $314_1$-$314_4$, in combination constitute the first semiconductor-based circuitry. In this example embodiment, a pair of diode modules $316_1$ and $316_2$ constitute the second semiconductor-based circuitry 258 (as may be arranged in the at least one cavity 254 (FIG. 4) in the enclosure 256) electrically coupled to the first semiconductor-based circuitry to produce a chopper circuit comprising a second chopper circuit topology fully contained in the enclosure 256. That is, fully occupying the entire enclosure 256 since cavity 254 is no longer empty. As noted above, this chopper circuit topology functions without any electromechanical-based circuitry.

In this example embodiment, each respective power switching module 314 comprises a respective semiconductor-based power switch, such as IGBT1 and a respective diode D1 coupled to one another in an anti-parallel circuit arrangement. Each respective diode module 316 may comprise two individual diodes each coupled to a respective power switching module to provide a free-wheeling function to the respective power switching module. For example, diode FWD 1 in diode module $316_1$ is connected to power switching module $314_1$ and diode FWD4 in diode module $316_2$ is connected to power switching module $314_4$. It is noted that in the embodiment illustrated in FIG. 5 the physical location of diode modules $316_1$ and $316_2$ is selected to be at the center location of the layout (e.g., a centrally filled cavity) to reduce inductance imbalance that could otherwise result in the respective interconnections between the power switching modules and the free-wheeling diodes. It is further noted that another advantageous feature of this embodiment is that the power switching modules are arranged to make utilization of both the positive rail and the negative rail of DC bus 312 to drive loads R1-R4. For example, power switching modules $314_1$ and $314_2$ are respectively arranged to bring electrical coupling with loads R1 and R2 through the positive rail of DC bus 312 whereas power switching modules $314_3$ and $314_4$ are respectively arranged to bring electrical coupling with loads R3 and R4 through the negative rail of DC bus 312. This is advantageous since such an arrangement is conducive to improved load distribution with respect to the positive and negative rails of the DC bus.

Figure 6:
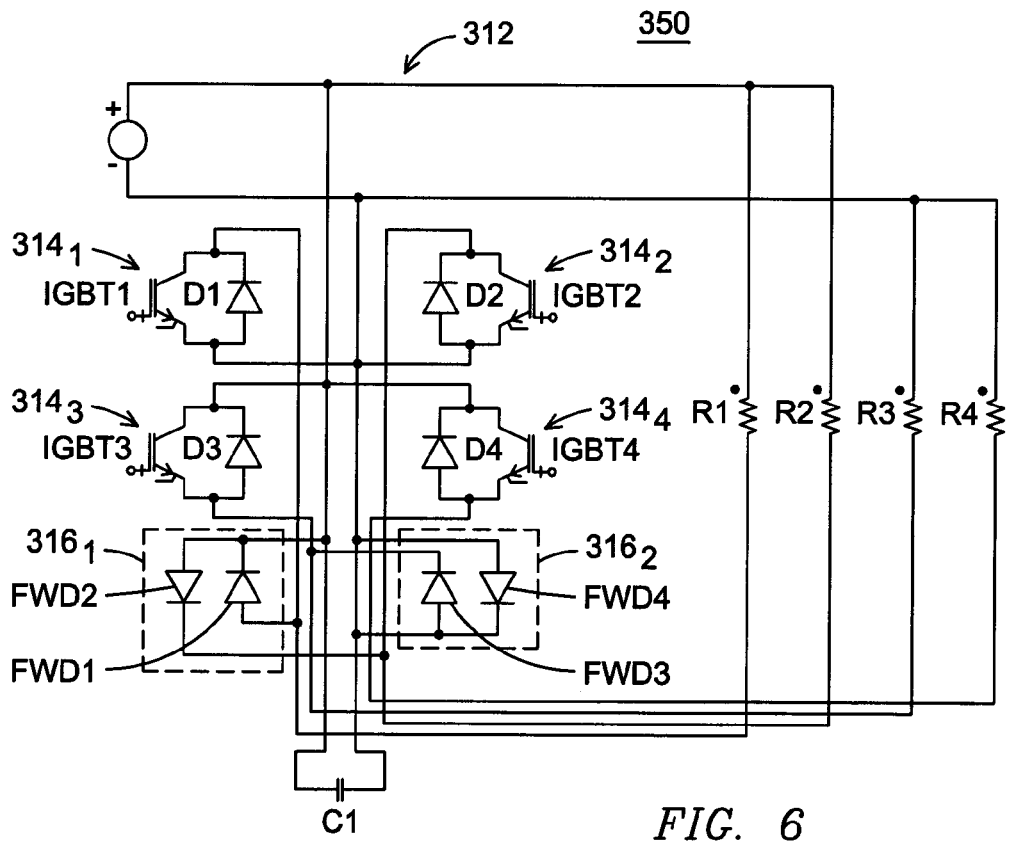
Figure 7:
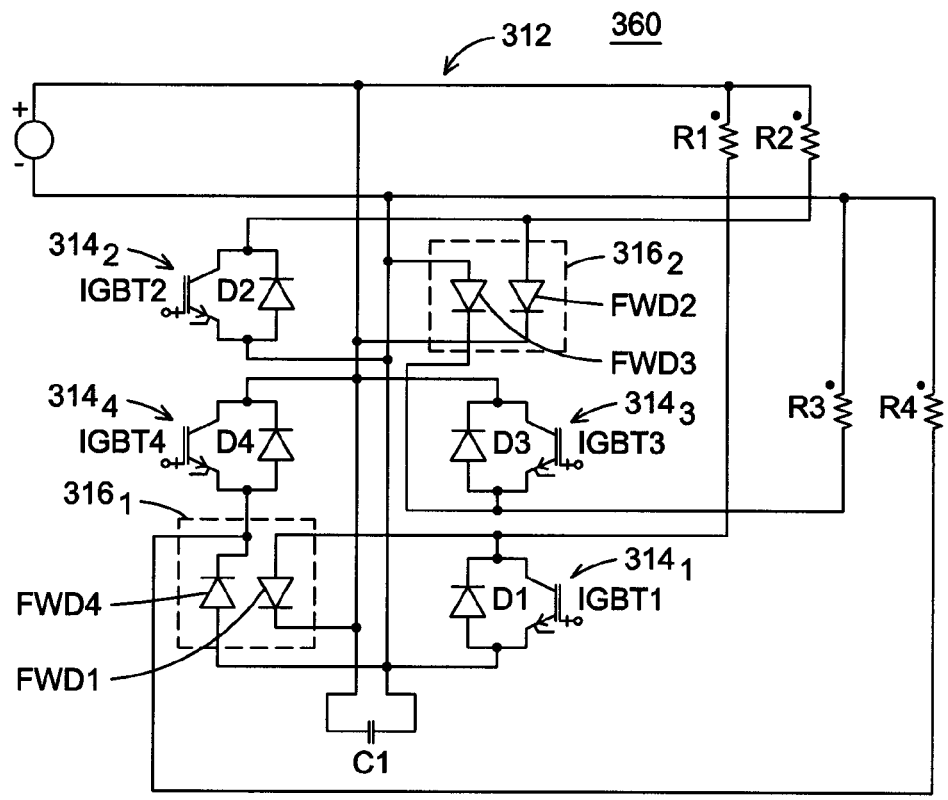

It will be appreciated that diode modules $316_1$ and $316_2$ need not be disposed at the center location of the layout. For example, FIG. 6 illustrates an example embodiment of a chopper circuit 350 where the physical location of diode modules $316_1$ and $316_2$ is selected to be at a bottom location of the layout. It will also be appreciated that diode modules $316_1$ and $316_2$ need not be disposed adjacent to one another. For example, FIG. 7 illustrates an example embodiment of a chopper circuit 360 wherein diode modules $316_1$ and $316_2$ are spaced apart from one another, such as at locations that are diagonally spaced with respect to one another.

Figure 8:
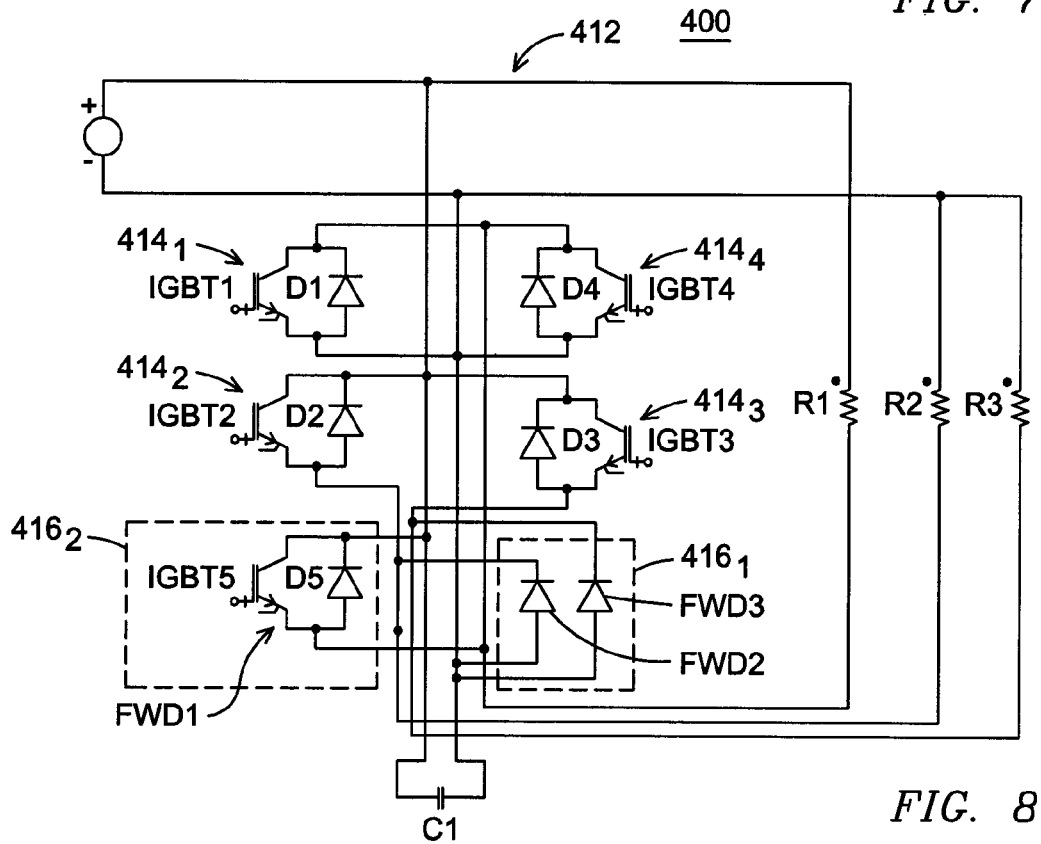

FIG. 8 shows an example embodiment of a chopper circuit 400 configured in accordance with aspects of the present invention to drive a triple load of elements for dissipating electrical power, such as resistive elements R1 through R3 electrically coupled between the positive and negative rails of DC bus 412. In this example embodiment, three semiconductor-based power switching modules $414_1$-$414_3$, in combination constitute the first semiconductor-based circuitry. As shown in FIG. 8, power switching module $414_1$ comprises dual IGBTs (and corresponding anti-parallel diodes) wherein the dual IGBTs are connected to one another in parallel circuit to for example drive resistive element R1. This parallel arrangement allows increasing the power-handling capability of power switching module $414_1$ for driving load R1.

In this example embodiment, one diode module $416_1$ and one power switching module $416_2$ (albeit used to provide a diode functionality) constitute the second semiconductor-based circuitry 258 (as may be arranged in the at least one cavity 254 (FIG. 4) in the enclosure 256) electrically coupled to the first semiconductor-based circuitry to produce a chopper circuit comprising a second chopper circuit topology fully contained in the enclosure 256. Diode module $416_1$ comprises free wheeling diodes FWD2 and FWD3 respectively connected to power switching module $414_2$ and $414_3$. As noted above, in this example embodiment the free wheeling diode function may be provided by power switching module $416_2$ provided such module is functionally used as a diode. Alternatively, one could use a diode module (similar to diode module $416_1$) to provide such free wheeling diode function.

Figure 9:
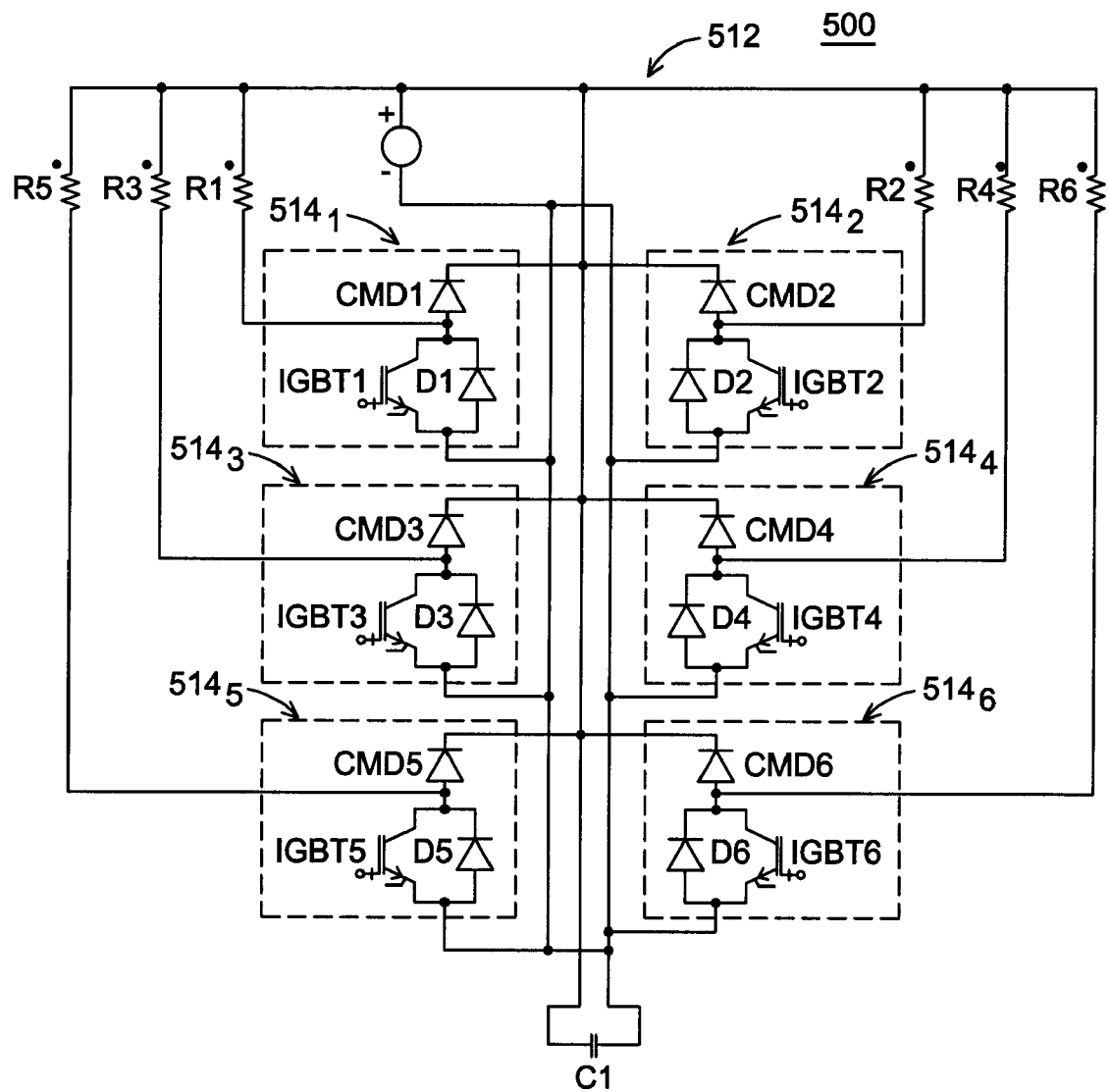

FIG. 9 shows an example embodiment of a chopper circuit 500 configured in accordance with aspects of the present invention to drive a sextuple load of elements for dissipating electrical power, such as resistive elements R1 through R6 electrically coupled between the positive and negative rails of a DC bus 512. In this example embodiment, six semiconductor-based power switching modules 5141-5146, may be used for driving resistive elements R1 through R6. It is noted that in this example embodiment each power switching module is of a type that includes an integral free wheeling diode.

It is also noted that, although FIG. 9 shows each power switching module $514_1$-$514_6$ connected to the positive rail, one skilled in the art will appreciate that such power switching modules may be arranged to make utilization of both the positive rail and the negative rail of DC bus 512 to drive loads R1-R6. For example, power switching modules $514_1$-$514_3$ could be respectively arranged to bring electrical coupling with loads R1-R3 through the positive rail of DC bus 512 and power switching modules $514_4$-$514_6$ could be respectively arranged to bring electrical coupling with loads R4-R6 through the negative rail of DC bus 512. Accordingly, it will be appreciated in view of the various example chopper circuit topologies described above, that aspects of the present invention advantageously enable the traction system designer of an off-highway vehicle with increased design versatility, which is conducive to accommodating at a relatively low cost various operational requirements that may vary from one given application to another.

As will be now appreciated by one skilled in the art, the ability to adapt the number of loads that can be driven by the chopper circuit is one example of the distinct operational requirements that can be fulfilled by a braking system embodying aspects of the present invention. The ability to adapt load distribution with respect to the positive and negative rails of the DC bus is another example of the distinct operational requirements that can be fulfilled by a braking system embodying aspects of the present invention. The ability to increment the power-handling capability of a given power switching module for driving a load coupled to that switching module is yet another example of the distinct operational requirements that can be fulfilled by a braking system embodying aspects of the present invention. The ability to select a physical location adapted to modify inductance imbalance in the respective interconnections between the power switching modules and the free-wheeling diodes is still another example of the distinct operational requirements that can be fulfilled by a braking system embodying aspects of the present invention.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. An adaptable electrical braking system in an electrical propulsion system of a traction vehicle, the electrical braking system configured to dissipate electrical energy in a plurality of resistor grids, said braking system comprising:

a braking system assembly comprising a baseline chopper circuit topology, said baseline chopper circuit topology comprising a first semiconductor-based circuitry in an enclosure for accommodating the first semiconductor-based circuitry, wherein the braking system assembly comprises an arrangement of power switching modules, each power switching module comprising a semiconductor-based power switch and a respective diode connected in an anti-parallel circuit to the power switch; and a second semiconductor-based circuitry electrically coupled to the first semiconductor-based circuitry to produce a chopper comprising a chopper circuit topology fully contained in the enclosure, and further wherein said second semiconductor-based circuitry comprises a circuit topology selectable to adapt said baseline chopper circuit topology to meet distinct operational requirements to be fulfilled by the braking system, wherein the second semiconductor-based circuitry comprises an arrangement of diode modules, each diode module comprising at least one diode connected to a respective power switch to operate as a free-wheeling diode, wherein the second semiconductor-based circuitry is disposed at a central location of the enclosure to reduce inductance imbalance in the respective interconnections between the power switching modules and the free-wheeling diodes.

2. An electrical propulsion system for a traction vehicle comprising:

an adaptable electrical braking system configured to dissipate electrical energy in a plurality of resistor grids, wherein the electrical braking system comprises:

a braking system assembly comprising a baseline chopper circuit topology, said baseline chopper circuit topology comprising a first semiconductor-based circuitry in an enclosure for accommodating the first semiconductor-based circuitry, wherein the braking system assembly comprises an arrangement of power switching modules, each power switching module comprising a semiconductor-based power switch and a respective diode connected in an anti-parallel circuit to the power switch; and a second semiconductor-based circuitry electrically coupled to the first semiconductor-based circuitry to produce a chopper comprising a chopper circuit topology fully contained in the enclosure, and further wherein said second semiconductor-based circuitry comprises a circuit topology selectable to adapt said baseline chopper circuit topology to meet distinct operational requirements to be fulfilled by the braking system, wherein the second semiconductor-based circuitry comprises an arrangement of diode modules, each diode module comprising at least one diode connected to a respective power switch to operate as a free-wheeling diode, wherein the second semiconductor-based circuitry is disposed at a central location of the enclosure to reduce inductance imbalance in the respective interconnections between the power switching modules and the free-wheeling diodes.

3. A method for adapting an electrical braking system to meet distinct operational requirements in an electrical propulsion system of a traction vehicle, said method comprising:

providing a braking system assembly comprising a chopper comprising a baseline chopper circuit topology, said baseline chopper circuit topology comprising a first semiconductor-based circuitry arranged in an enclosure, wherein the braking system assembly comprises an arrangement of power switching modules, each power switching module comprising a semiconductor-based power switch and a respective diode connected in an anti-parallel circuit to the power switch;

selecting a second semiconductor-based circuitry to adapt said baseline chopper circuit topology to meet distinct operational requirements to be fulfilled by the braking system, wherein the second semiconductor-based circuitry comprises an arrangement of diode modules, each diode module comprising at least one diode connected to a respective power switch to operate as a free-wheeling diode;

arranging the second semiconductor-based circuitry at a central location of the enclosure; and electrically coupling the second semiconductor-based circuitry to the first semiconductor-based circuitry, wherein the arranging of the second semiconductor-based circuitry at the central location of the enclosure reduces inductance imbalance in respective interconnections between the power switching modules and the free-wheeling diodes.

\* \* \* \* \*